United States Patent

Lincoln

[15] 3,692,225

[45] Sept. 19, 1972

[54] SEMICONDUCTOR DEVICE FABRICATION APPARATUS

[72] Inventor: Milan L. Lincoln, Scottsdale, Ariz.

[73] Assignee: Motorola, Inc., Franklin Park, Ill.

[22] Filed: Sept. 9, 1970

[21] Appl. No.: 69,422

Related U.S. Application Data

[63] Continuation of Ser. No. 732,772, May 28, 1968, abandoned.

[52] U.S. Cl. ..........................228/4, 29/576, 29/589, 29/626, 39/628, 228/6, 228/13, 228/44

[51] Int. Cl. ..........................B23k 11/00, B23k 37/04

[58] Field of Search ....228/4, 6, 13, 44; 29/576, 589, 29/626, 628; 113/119

[56] References Cited

UNITED STATES PATENTS

| | | | |
|---|---|---|---|
| 3,395,439 | 8/1968 | Paleri et al | 228/4 X |
| 3,491,426 | 1/1970 | Grassauer | 228/44 X |
| 3,589,591 | 6/1971 | Schwenn | 228/44 |

*Primary Examiner*—John F. Campbell
*Assistant Examiner*—R. J. Craig
*Attorney*—Mueller and Aichele

[57] ABSTRACT

A jigging tool and method for simultaneously bonding a plurality of semiconductor dice on a corresponding plurality of mounting bases and to a plurality of electrical leads in strip form while accurately maintaining such plural structures in a fixed position. Pivoted weight means are disposed on a jigging tool for forcing the electrical lead strip against the corresponding dice and the mounting base strip and the tool is mounted at an angle such that gravity forces the dice and the lead strip into an indexed relationship. The same indexing means in the form of posts or studs is used to locate the lead strip and the weight means which engages the lead strip to provide alignment between those structures. Rigid teeth-type aligning means in the jigging tool align the mounting portions of the mounting bases such that each such portion and each semiconductor die has the same respective relationship throughout the mounting base strip. The dice and lead strip are simultaneously soldered or otherwise bonded to the mounting portion, and at the same time portions of the lead strip are soldered or otherwise secured to contact portions on the dice. This simultaneous soldering is accomplished in the small mass of the tool such that the thermal inertia in the tool and maintained structures is minimized. A low profile in the tool provides ease of usage and handling. The lead strip is novel in that it has stable yet independently flexible contact portions for securing to the contact portions on the dice.

21 Claims, 10 Drawing Figures

INVENTOR
MILAN L. LINCOLN
BY
Mueller, Aichele & Rauner
ATTORNEYS

INVENTOR
MILAN L. LINCOLN

BY
Mueller, Aichele & Rauner
ATTORNEYS

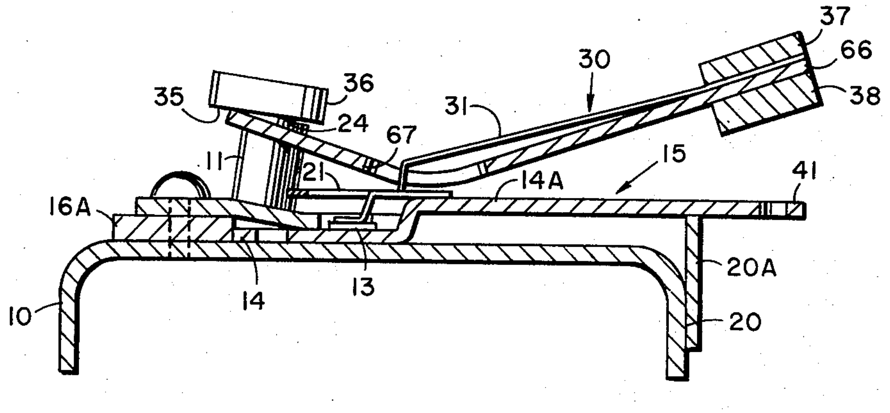
FIG. 5
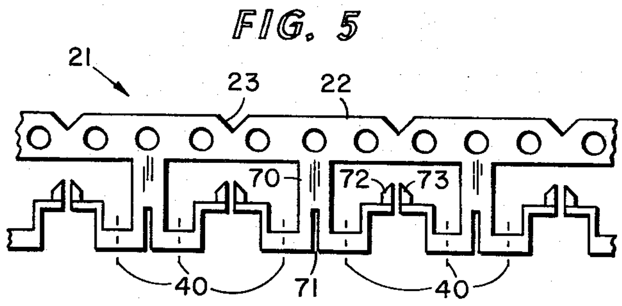
FIG. 6
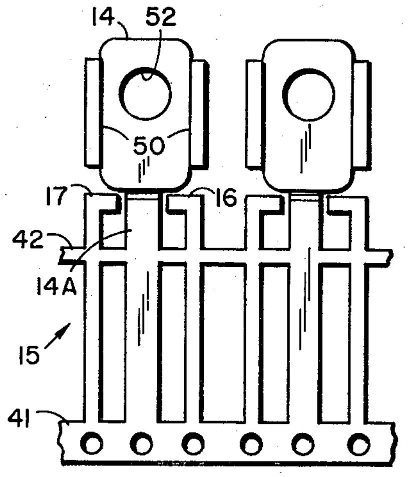
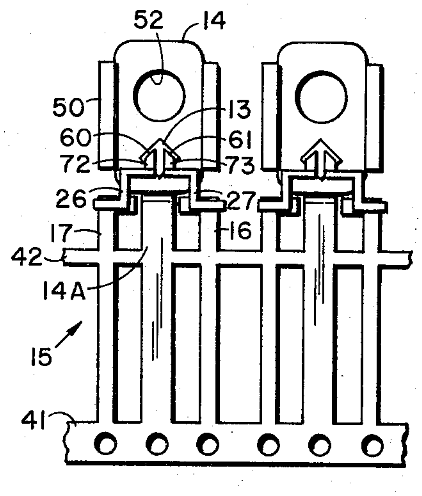
FIG. 7 FIG. 8
INVENTOR
MILAN L. LINCOLN
BY
Mueller, Aichele & Rauner
ATTORNEYS

SEMICONDUCTOR DEVICE FABRICATION APPARATUS

This application is a continuation of Ser. No. 732,772, filed May 28, 1968, now abandoned.

BACKGROUND OF THE INVENTION

This invention relates to methods and apparatus for assembling semiconductor dice to mounting bases and strip-type lead frames wherein all the bonding or soldering operations are performed simultaneously.

The greater part of the cost of semiconductor device fabrication is incurred in the labor for the assembly of the dice with a mounting base, bonding the dice to suitable conductive structure which also serves as a heat sink, and making electrical connections between the dice and base. The assembly is then encapsulated in various ways. Initially, semiconductor device fabrication involved the bonding of a single semiconductor die to a single mounting base, and then wire bonding the connections on top of the die to various connector pins on the mounting base. This proved to be too costly. The next method was to make lead frames in strip form wherein a large plurality of interconnections are formed in one lead strip for a corresponding plurality of semiconductor devices to be assembled. In such arrangements, dice are individually indexed to each device portion of the original lead frame or strip. Separate operations in bonding the dice and leads are required when leads in strip form are used.

It is desired to reduce the number of steps in the assembly process, and particularly the number of hand manipulations, such that the cost may be further reduced. However, the small dimensions of semiconductor dice and cumulative tolerances normally associated with strip-type lead frames having a large number of device portions for the ultimate individual devices make an incompatible situation preventing simultaneously assembling a plurality of semiconductor dice and associated connectors in a single operation.

In high power semiconductor devices of the type having surge currents, such as thyristors, a separate surge pad has been added to the device electrical contacts to prevent device burnout. During steady state operation, heat generated in a semiconductor device is usually removed through heat sink apparatus. In devices having electrical contacts remote from the heat sink, as on an opposite face of a semiconductor dice, large amplitude surge currents of short duration create local excessive heat remote from the heat sink that must be removed through a thermal path other than the heat sink. The usual electrical contact on a semiconductor device is deposited from a vapor and has little mass to absorb heat. Therefore, it has been the practice to solder a conductive "surge pad" on the contacts which carry large amplitude surge currents of short duration. Such surge pads are of material having a high specific heat such that the capability of rapidly absorbing the surge current generated heat is maximized. The mass of the surge pad, its specific heat, and its relation to the electrical device, usually limit the capability of such semiconductor devices to withstand large electrical current surges.

SUMMARY OF THE INVENTION

It is an object of this invention to reduce the number of individual steps in the semiconductor device fabrication. This object is provided by the simultaneous die bonding and contact bonding of a plurality of semiconductor dice with their plurality of associated contacts in a single operation.

It is another object of this invention to reduce the effective cumulative tolerances in lead strip assemblages so as to speed up the total fabrication time and improve the yields of devices in such fabrication.

It is a still further object to provide a semiconductor device with large surge current capabilities.

The frame of the tooling jig of the present invention has a plurality of rigid parallel extending teeth or aligning means in the shape of a comb adapted to slidably receive a like plurality of mounting bases with conductors in strip form for realigning same with respect to each other. The mounting base strip conductors each have a free end adjacent a die mounting portion of the mounting base. Each tooth or aligning means has a semiconductor die receptacle which accurately positions on a mounting portion a die having a solder coating on its under side. The frame of the jig is mounted at an angle such that the dice slide into the receptacles. A solder-coated lead strip having a plurality of lead portions for making connections between the dice and the various conductor-free ends of the mounting base strip has an indexing portion for engaging a pair of indexing studs on the tool frame. These indexing studs are spaced inwardly from the extreme ends of the tool frame such that any camber in the lead strip does not adversely affect the step of locating the lead strip lead portions with respect to the several semiconductor dice and mounting base strip conductors. The lead strip is designed such that the free ends of the lead portions are disposed over the electrical contact portions of the semiconductor dice when located in the respective receptacles. The lead strip has lead portion supporting arms with bifurcated end portions which are somewhat flexible to permit freedom of motion to the lead portions when bringing the lead strip and dice together into a bonding or soldering position, but still provide stability to the assembly. A weight portion in the tool having a plurality of resilient fingers is disposed over the lead strip forcing the lead portions against the semiconductor contacts and the conductor free ends. Alternately, the conductor free ends and the die contacts may be solder coated prior to assembly as opposed to solder coating the lead strip. The assemblage in the jigging tool or apparatus is then inserted into an oven and heated for simultaneously solder bonding the connectors together and the semiconductor dice to the mounting bases. Subsequent to the bonding operation, the assemblage is removed and the lead strip is severed for making a plurality of individual semiconductor device units from the assemblage although the mounting base is maintained in strip form until after the individual die and associated conductors are plastic encapsulated.

A weight lever system is utilized in the jigging tool and has a downwardly facing pivot surface disposed intermediate the indexing studs. The weight lever pivots about this downward facing pivot surface as a pair of indexing edges on the weight lever slidably engage the indexing studs such that a plurality of resilient or spring fingers mounted on the weight lever accurately engage the connector portions of the lead strip. The spring fingers are part of an etch-cut stainless steel plate, and are located in a parallel manner along the length of the frame. The fingers have a tapered cross section with a minimum cross section adjacent the lead strip and a maximum cross section adjacent an outer edge of the weight lever. This arrangement assures that all spring fingers apply an equal force on the lead strip.

To minimize mass in the weight lever, weight bars are located at an outer edge portion remote from the pivot surface. A large plurality of apertures or other forms of openings are provided in the weight lever immediately over the semiconductor dice and the lead portions of the lead strip to provide air circulation thereacross during bonding in an oven. This arrangement hastens the bonding process.

In inserting the semiconductor dice into the dice receptacles in the jigging tool or apparatus, the tool frame is disposed at an angle such that the dice slide into the receptacles. After the dice have been located and the weight lever inserted on the tool such that the dice are securely held on the mounting base portions, then the tool frame is leveled before insertion into an oven. This arrangement minimized the height of the tool as well as reduces its mass.

The semiconductor device produced by the novel method or jigging tool has desirable mechanical and electrical characteristics. The novel lead strip making electrical connection to the device contact acts as a surge pad for contacts carrying heavy surge currents of short duration, provides increased heat dissipation from the electrical contacts, and has a flexibility for permitting relative movements between electrical conductors and the semiconductor dice.

THE DRAWINGS

FIG. 5 is an enlarged sectional view taken in the direction of the arrows along line 5—5 in FIG. 2 showing the pivot arrangement of the weight lever.

FIG. 6 is a plan view of a lead strip usable with the present invention.

FIG. 7 is a plan view of a mounting base strip usable with the present invention.

FIG. 8 is a plan view of a completed assembly after the lead strip indexing portion has been removed but before the mounting base strip has been encapsulated and cut into individual semiconductor devices.

DETAILED DESCRIPTION OF THE ILLUSTRATIVE EMBODIMENT

Figure 4:
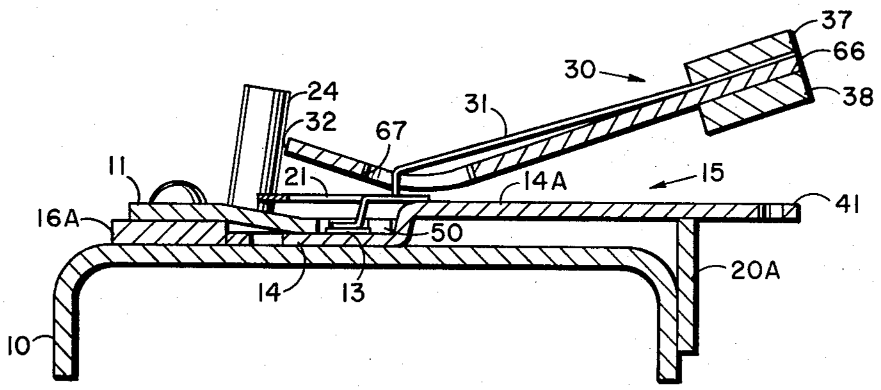
FIG. 4 is an enlarged sectional view taken in the direction of the arrows along line 4—4 in FIG. 2, and shows the engagement of the various spring fingers with a lead portion in a lead strip.
Figure 1:
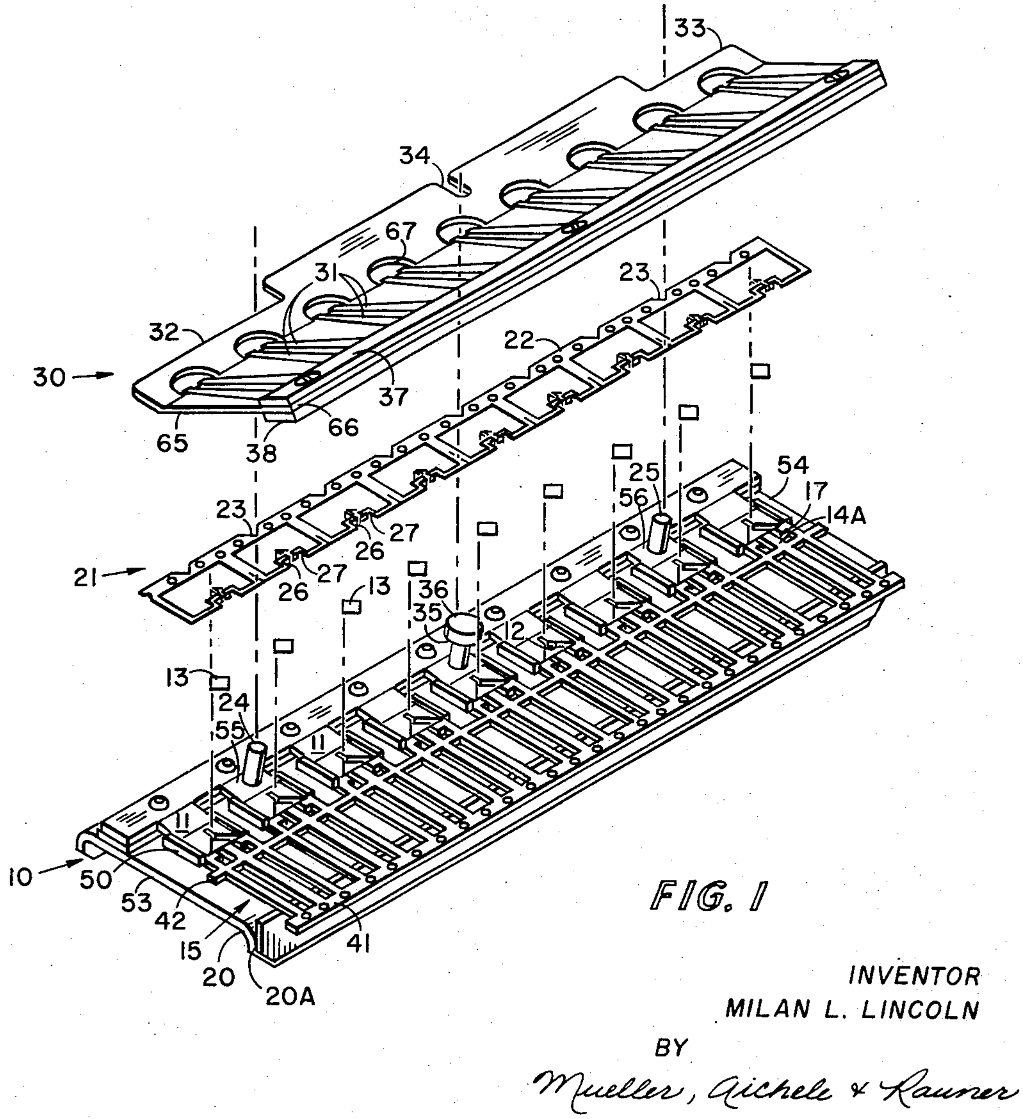
FIG. 1 is an exploded diagrammatic isometric view of a part of a complete jigging tool or apparatus utilizing the present invention, together with semiconductor dice, a mounting base strip, and a lead strip.

Referring more particularly to the drawing, like numbers indicate like parts and structural features in the various views. The illustrated solder jig includes frame 10 with a plurality of heavy spring steel aligning teeth 11 extending in equally spaced relation over the frame. Each tooth or aligning means 11 has a dice locator opening or receptacle 12 for receiving a semiconductor die 13 (an electrical element) and accurately positioning the same therein. Each receptacle 12 has an enlarged apex for receiving the corner of a die 13. Some dice may have a small burr at a corner which, in the absence of the enlarged apex, could misalign the die with respect to the cooling and lead strip 21. Further, the triangularly shaped receptacle facilitates removal of the dice therefrom in that the sides of the die contacting the receptacle edges all leave the respective contacting points simultaneously thereby eliminating a small burr on a dice from catching on the receptacle to break any of the soldered connections later referred to.

The teeth 11 are adapted to slidably receive and accurately align the mounting base portions 14 of the mounting base strip 15. While 9-unit forming strips are illustrated, it is to be understood that the selection of the number of units to be simultaneously bonded is one of design choice. The spacing between teeth 11 and an upper surface of frame 10 is slightly less than the thickness of mounting portions 14 such that the teeth securely hold portions 14 when inserted therebetween. The teeth are rigid with respect to the mounting base strip 15 and, therefore, accurately align the mounting base portions with respect to the base conductors 16 and 17 of each unit portion (consisting of a mounting base portion 14 and two conductors 16, 17) of mounting base strip 15. Mounting base strip 15 portions 14 are slid under teeth 11 against stop member 16A to align all mounting base portions 14 along the strip. Then the outer edge portion 20 of frame 10 is moved upwardly such that frame 10 is disposed at about 45° from the horizontal. A plurality of semiconductor dice 13 are then inserted into dice receptacles 12.

In the next step the lead strip 21 indexing portion 22 is placed on the frame with two of the notches 23 engaging indexing studs 24 and 25, respectively. This placement accurately locates the various lead portions 26 and 27 of lead strip 21 over the electrical contacts, i.e., land areas, of the respective semiconductor dice 13 and conductors 16, 17. Dice 13 have various thicknesses and the lead strip 21 may have deformations such that the lead portions 26 and 27 may not reach the dice land areas or the free ends of conductors 16, 17. To ensure good contact despite such unpredictable variations, weight lever 30 is disposed over the entire assembly with its plurality of depending stainless steel spring fingers 31 engaging the respective lead portions 26 and 27. Weight lever 30 has indexing edges 32 and 33 respectively slidably engaging indexing studs 24 and 25. It also has a central pivot notch portion 34 engaging the downward-facing pivot surface 35 on central pivot stud 36. Lead strip 21 indexing portion does not contact stud 36 (FIG. 4). A pair of weights 37 and 38 at the outer edge of the lever 30 force spring fingers 31 against lead portions 26 and 27, as is more fully described later.

To insert weight lever 30, notch portion 34 is first placed around pivot stud 36 with the fingers extending through apertures 67 to engage lead portions 26, 27. The assemblage (FIGS. 2, 4 and 5) is inspected to see that all fingers 31 are properly engaging the respective lead portions 26 and 27. The assemblage is then placed in an oven and heated to soldering temperatures while the solder on the lead strip 21 and on the semiconductor dice melts and bonds the respective members to each other. Weight lever 30 forces the soldered parts together for a good solder bond. Upon removal from the oven, the weight lever 30 is removed and the soldered members, including lead strip 21 and mounting base strip 17, are removed from frame 10. Then the lead strip is severed along lines 40 (FIG. 6) leaving the assembly as shown in FIG. 8.

Next, the mounting base strip 15 is placed in a plastic molding machine (not shown) whereupon the mounting base portions 14 are plastic encapsulated in a known manner. This invention permits the simultaneous die and lead bonding in a strip form suitable for placement in a plastic encapsulating machine which accommodates such strips. Each mounting base portion 14, conductors 16, 17, and lead portions 26, 27 are a "set" of leads and a support for making an individual semiconductor device. After plastic encapsulation, the assemblage is removed from the mold and the indexing portion 41 and tie strip 42 of mounting base strip 15 are severed creating a plastic encapsulated semiconductor unit or device with three leads 16, 17 and 14A extending therefrom.

As best seen in FIGS. 4 and 5, frame 10 is a U-shaped channel of relative low mass. The entire assembly is kept as a small mass such that the thermal inertia is minimized for facilitating a quick bonding operation in an oven. The outer edge 20 of frame 10 has a rest bar 20A to support the mounting base strip 15 for ensuring the proper horizontal position of the strip which in turn facilitates engagement between leads 16 and 17. Indexing teeth 11 snugly slide between upstanding flanges 50 of the respective mounting base portions 14. This accurate alignment is important to provide a good yield of operative semiconductor units or completed devices. For example, when strip 15 is placed in a plastic encapsulation molding machine, a mold locator pin (not shown) descends through the respective apertures 52 (FIGS. 7 and 8) in mounting base portions 14 to accurately align the strip 15 with respect to the mold. Unless the mounting base portions are previously accurately aligned in the jigging tool, stresses introduced in the assembly destroy semiconductor dice 13 or break electrical connections to create a faulty device. Since these lead portions are relatively heavy with respect to the size of the contacts of dice 13, inoperative devices could result. Therefore, indexing teeth 11 and stop member 16 provide an accurate alignment of the mounting base strip 15 such that a subsequent single molding operation can be performed simultaneously on all the units to be made from the strip assemblage. The two indexing studs 24 and 25 are mounted inwardly of the longitudinal ends 53 and 54 of frame 10 to receive notches 23. The purpose of inward mounting is to reduce the error introduced by any camber in lead strip 21.

In observing lead strip 21, it is noted that indexing portion 22 has little metal working, whereas lead portions 26 and 27 all along one longitudinal edge have a substantial amount of metal working performed thereon. This working causes the metal to stretch. As a result, the longitudinal ends of indexing portion 22 tend to curl to form a concave indexing portion, i.e., the lead portion of the lead strip is slightly longer. This camber moves the lead portions 26 and 27 with respect to each other such that they are not in a straight line as required in lead strip fabrication processes. It has been found that by placing the index posts 24 and 25 inwardly of the longitudinal ends such as at teeth 55 and 56 of frame 10, the camber problem is alleviated.

Since the lead portions 26, 27 of lead strip 21 are relatively small, it is important that spring fingers 31 of weight lever 30 be accurately positioned to engage the lead portions, as best seen in FIG. 5. The outer or free ends of the spring fingers 31 engage lead portions 26 and 27 intermediate the outer extremities thereof which engage the electrical land areas 60 and 61 (FIG. 8) on dice 13, and this action causes the engagement of intermediate portion of the lead portion with conductors 16, 17 of mounting base strip 15. Edges 32 and 33 are accurately formed such that the spacing between the various fingers 31 and the edge is constant along the length of weight lever 30. By indexing the lead strip 21 against the same indexing studs 24 and 25 as the weight lever, assurance is provided that there is a reliable engagement between the fingers 31 and the desired areas of lead strip 21. If the fingers 31 engage the lead strip 21 outside this area, a faulty connection could be made. Of course, tolerances in the tooling should be carefully selected and observed in the fabrication of this jig or tool.

In fabricating a high power semiconductor device, such as a thyristor, the thickness of the semiconductor die can vary several mils. This variation, together with the variations in lead strip 21 which is constructed of copper alloy, requires that any weight exerted along the length of the lead strip be consistent and automatically adjustable to the thickness of the various dice, i.e., the heights of the land areas 60 and 61 on the various dice 13 with respect to the upper surface of frame 10. Such adjustment provides a good weight system for soldering. A stainless steel spring was etch cut from plate stock stainless steel. It was found that if the spring was stamped, strains were introduced into the fingers 31 causing the various fingers to exert different tensions and thereby make a condition susceptible to faulty interconnections between the dice and conductors. Fingers 31 are tapered such that the smallest cross section is immediately adjacent to the dice 13 and the greatest cross section is adjacent the weight members 37 and 38 which also secure the unitary spring to lever 30. Stainless steel is desired since it does not outgas when heated to soldering temperatures. By making the tapered fingers long, the weight exerted by weight lever 30 on the various lead portions 26, 27 throughout the length of the strip has been found to be sufficiently constant to effect a good solder bond on a mass production basis. The exact forces required for optimum operation with a given type of lead strip 21 are empirically determined.

Figure 2:
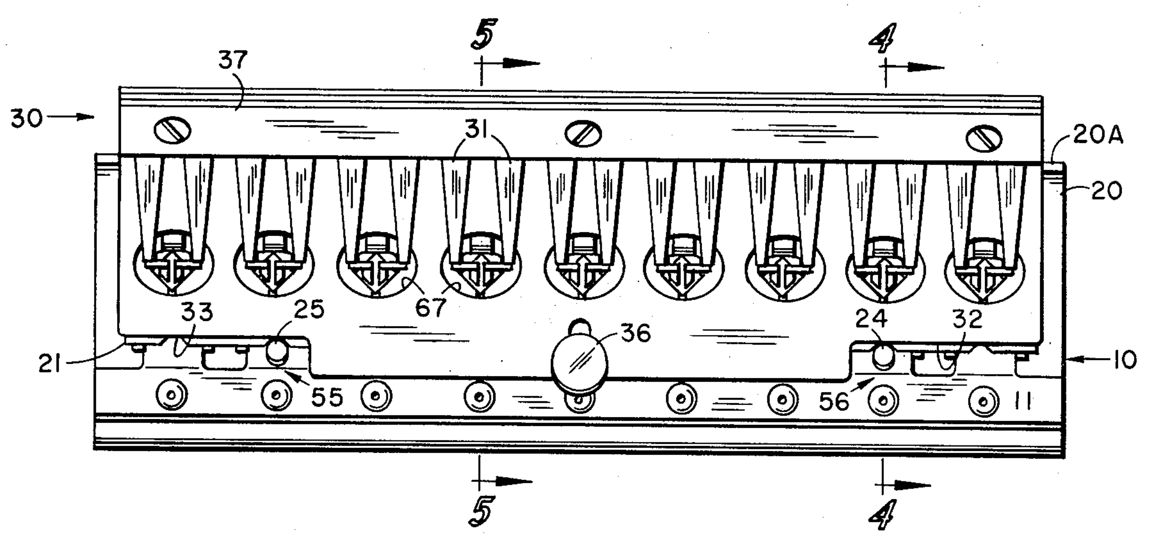
FIG. 2 is a plan view of the tool structure with the parts to be assembled located therein.
Figure 3:
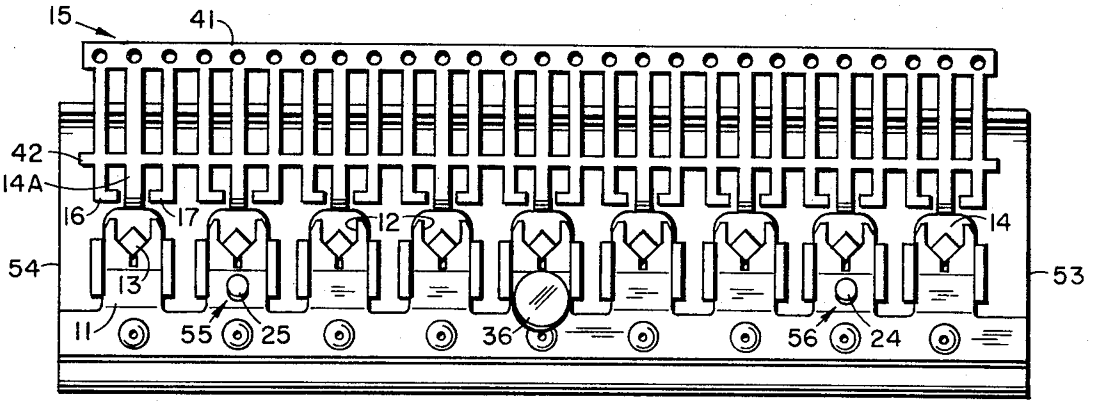
FIG. 3 is a plan view of the tool frame with the semiconductor dice located in receptacles of the aligning teeth.

Weight lever 30 is a low-mass highly effective weight-distributing apparatus. The pivot slot portion 34 slides around upstanding stud 36 and pivotally engages downward-facing pivot surface 35. The distance between pivot slot 34 and the engagement of the fingers 31 is less than the distance between the pivot slot 34 and the weight bars 37 and 38. This arrangement reduces the total weight required to exert a predetermined force on lead portions 27 and 26. Weight lever 30 formed of a single plate 65 has an upwardly angled portion 66 which holds the weight bars 37 and 38. Apertures 67 are formed in plate 65 through which each pair of fingers 31 extend downwardly to engage lead strip 21. Apertures 67 are quite large to facilitate the movement of air in the oven down to and across semiconductor dice 13 and the other areas to be soldered. Weight lever 30 when mounted on frame 10, as best seen in FIGS. 2 and 5, has a relatively low profile such that a good number of units may be inserted in a given size oven at one time for facilitating simultaneous soldering of a large number of semiconductor units. To reduce the heating up and cooling off time, thereby reducing total assembly time, the total mass of the frame and weight lever 30 is kept to a minimum. It is made of stainless steel to prevent outgassing. It also could be fabricated of a nickel-coated metal or alloy.

Referring to FIG. 6, lead strip 21 indexing portion 22 has a plurality of outwardly extending arms 70. Each arm has a bifurcation 71 extending from the outer extremity of the arm toward the indexing portion to a point about even with the free ends 72 and 73 for engagement with the land areas on dice 13. It has been found that without such bifurcations, lead strip 21 does not have enough independent flexibility for lead portions 26 and 27 to have good contact during the soldering process. On the other hand, if bifurcations 71 were extended to indexing portion 22, the lead portions become so flimsy and so readily deformed that lead strip 21 could not be handled easily and efficiently. Therefore, arm 70 with bifurcations 71 provides independent flexing of the lead portions 26 and 27 and yet stabilizes those lead portions to permit easy handling. Further, it is believed that bifurcations 71 relieve the metal working induced strains in strip 21, thereby reducing the camber problem referred to above.

The respective connections formed from the lead portions of lead strip 21 between the dice contacts 60, 62 and conductors 17, 16 have sufficient flexibility to permit some relative movements between mounting base portion 14 and conductors 16, 17. This flexibility increases the yield of semiconductor devices in that when strip 15 is removed from frame 10 and in subsequent handling there may be some twisting of strip 15. These lead portions have a rectangular bar-type cross section (best seen in FIGS. 9 and 10). These bar-type lead portions have a large cross section when compared with 8-mil diameter wires. Therefore, they offer less electrical resistance and provide an improved thermal path better than 8-mil diameter wide, for example. Each lead portion has a portion transverse to the conductor 16 plane and the die mounting means plane joined thereto by a right angle band. This arrangement provides a freedom of movement between the die mounting means 14 and electrical conductor 16.

Therefore, utilizing strip 21 and the apparatus illustrated in FIGS. 2, 4, and 5, in particular, the method of the present invention provides a rugged assembly of metal and semiconductor portions for a plurality of semiconductor devices to be encapsulated in strip form and then separated into individual semiconductor devices. The delicate fine wire connections which had to be bonded one at a time to the semiconductor die are eliminated to simplify the assembly of the devices relative to prior practices, improve production yields, and improve the thermal characteristics of the devices, and thus improve their operation.

The method and apparatus of this invention are applicable to a wide variety of devices, lead strip configurations, and mounting base configurations. The size of the parts may vary over wide ranges. Further, more than two contacts may be simultaneously completed. Each spring finger could be used to force two lead portions against their respective contacts; however, in such instances, tolerances of the lead strip and die contacts would be tighter. While the present most advantageous usage of the present invention is with plastic encapsulated electrical devices, it is understood that the simultaneous bonding techniques of this invention are also applicable to can sealed devices (example, TO-5 can), ceramic packages (integrated circuit flat packs, for example), and the like.

Figure 10:
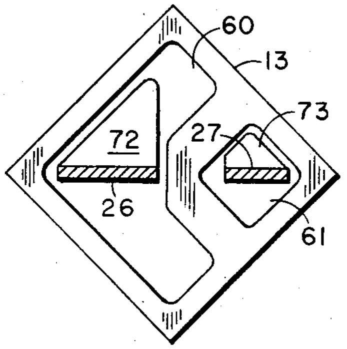
FIG. 10 is a diagrammatic plan view of connections made to a semiconductor die contact.

The free end portion 72 of lead strip 21 in addition to making an electrical contact also serves as a surge pad for the semiconductor device being fabricated. Such a surge pad is important to increasing the surge or transient current through a semiconductor device. Under normal steady-state operation, heat generated in the semiconductor dice 13 is dissipated through the mounting portion 14 at one side of the dice. Under transient high-current conditions, excessive heat is generated in the dice opposite to the one side, such as at the contact 60. This locally generated excessive heat is removed from the semiconductor to the surge pad formed by free end portion 72 (FIGS. 8 and 10). In the illustrated embodiment, dice 13 is a thyristor wherein contact 61 is the gate electrode, the one side of the dice is one current-path electrode, and contact 60 is the other current-path electrode. Therefore, contact 60 receives heat when the thyristor switches on, i.e., a large surge current flows when the thyristor is first made conductive. Prior to this invention, a separate surge pad was soldered to contact 60 and then wires were bonded from the separate surge pad to the conductor 16 (FIG. 8). By making lead strip 21 of material having a high specific heat, such as a copper alloy, and making the free end portion 72 relatively large with respect to contact 60 and the expected current density and heat generated, the separate surge pad is replaced by free end portion 72. This replacement saves labor in that one solder operation plus handling a separate surge pad is eliminated. The free end portion 72 being relatively large, also distributes the current over a large area of contact 60 such as to prevent hot spots from developing. Such hot spots can cause the semiconductor dice to disintegrate. This latter feature of this invention is enhanced by the weight distribution apparatus 30 providing an equalized spring force on each of the leads 26, 27 for forcing the free end portions 72 and 73 against the respective electrical contacts to firmly hold dice 13 against mounting portion 14 as well as the contact end portion 72, 73 against the electrical contact 60, 61 on the dice 13. Such combination provides the simultaneous fabrication of a plurality of surge pads electrical contacts.

Figure 9:
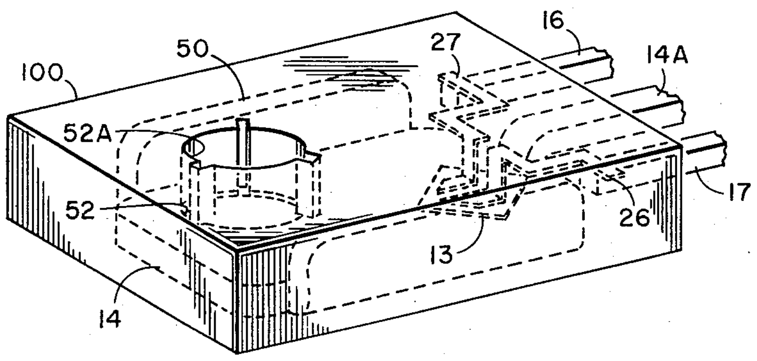
FIG. 9 is a isometric view of a completed device with the internal parts shown in dotted line outline form.

FIG. 9 is a perspective view of a final device encapsulated by material 100 with the encapsulated parts shown in dotted line form. The aperture 52A extending through the plastic encapsulating material 100 was formed by a mold pin (not shown) in a transfer mold. A bolt (not shown) is inserted through apertures 52 and 52A to secure the device to a mounting unit (not shown).

What is claimed is:

1. Apparatus for facilitating the fabrication of semiconductor devices, each semiconductor device to have a semiconductor die mounted on a die receiving means, a lead strip having lead portions to be bonded between respective dice and electrical conductors adjacent the die receiving means, the strip being in sets of lead portions each set for use with an individual electrical unit, the improvement including in combination, a frame member extending longitudinally along a first direction, having an upper surface, and along one longitudinal edge having a plurality of rigid aligning means extending transverse to said first direction and spaced from said upper surface; each aligning means having a die-receiving receptacle, a pair of indexing studs on said frame adjacent said one longitudinal edge and spaced inwardly from the longitudinal extremities of said frame member, a pivot member extending transverse to said aligning means and said first direction and located centrally between said frame-member-longitudinal extremities, and spaced closer to said one longitudinal edge of said frame member than said indexing studs and having a downwardly-facing pivot surface, said aligning means being spaced apart along said first direction for receiving a plurality of semiconductor die mounting means which are adapted to slide intermediate said aligning means and said frame member such that all of said die receiving means are accurately aligned with respect to said conductors, said indexing studs adapted to receive an indexing portion of a lead strip disposed over said plurality of aligning means with lead portions of the lead strip engaging the die and said conductors, and weight means adapted to be movably disposed on said frame member for pivotally engaging said downwardly-facing pivot surface and having a plurality of depending fingers for engaging a lead strip at the respective lead portions thereof adjacent semiconductor dice in the apparatus for simultaneously forcing such lead portions against the corresponding dice to make a solderable contact between said lead portions and said dice adjacent said aligning means and between said dice and said mounting portions, respectively.

2. The apparatus of claim 1 wherein said weight means includes a plate elongated in said first direction and having first and second longitudinal edge portions thereon and upper and lower sides and having a given weight, a leaf spring mounted on said first edge portion and including said depending fingers as a plurality of independently-yieldable variable-tension spring fingers extending along said plate and past said lower side toward said aligning means and adapted to engage said lead strip intermediate said respective semiconductor dice and said mounting base strip, said plate having an indexing edge along said second edge portion slidably engaging said indexing studs and having a pivot portion for engaging said downwardly-facing pivot surface, and weight means along said first edge portion forcing said fingers downwardly to pivot with respect to said downwardly-facing pivot surface.

3. The apparatus of claim 2 wherein said die-receiving receptacles are triangularly-shaped openings with enlarged apexes and facing away from said one longitudinal edge for receiving a semiconductor die with one corner thereof being at the enlarged apex of the triangle.

4. The apparatus of claim 3 wherein said frame member has a stop member extending along said one longitudinal edge and supporting said aligning means in a spaced-apart relationship from said frame member upper surface and said stop member serving to align all semiconductor die-receiving portions of said mounting base strip in one longitudinally extending line whereby said mounting bases are aligned in two directions.

5. The apparatus in claim 4 wherein said frame member further includes an upstanding edge member opposite said one edge for supporting an indexing portion of said mounting base strip to make alignment of the mounting base strip traverse to said one direction.

6. The apparatus of claim 4 wherein said weight means plate has a plurality of large apertures through which said depending fingers downwardly extend for permitting air circulation to said mounting portions, semiconductor dice, and lead strip, said weight means plate second edge portion being disposed substantially parallel to said frame member and said first edge portion of said weight means extending upwardly away from said frame member.

7. The apparatus of claim 6 wherein said weight means plate has a weight adding member extending along its second edge portion for reducing the total mass of said apparatus for a given force to be applied against the lead portions of the lead strip.

8. The apparatus of claim 7 wherein said depending fingers are portions of an etch-cut stainless-steel unitary member with each finger uniformly tapering to its smallest dimension immediately adjacent the engagement with said lead portions.

9. The apparatus of claim 8 wherein said frame member has legs of equal lengths such that when disposed on a level surface the frame member is level and adapted to be disposed at an angle with said one longitudinal edge whereby said dice and said lead strip are gravitationally indexed to a desired position.

10. An electrical device assembly apparatus for facilitating the simultaneous assembly of a plurality of electrical units each having an active electrical element, a mounting base portion supporting the element, a plurality of conductors each with a free end portion adjacent the mounting base portion and a like plurality of plate-like lead portions respectively extending between the free end portions and electrical contact land areas on the electrical element, the mounting base portion and conductors initially being in a unitary strip having plural sets of such portions and conductors with an indexing portion supporting the sets in a yieldable manner, the lead portions being in a unitary lead strip having an indexing portion having at least two indexing V-shaped slots opening away from the lead portion and with arms extending from the indexing portion at spaced apart locations to support the lead portions, the arms having a greater cross section than the lead portions for stabilizing same with respect to the lead strip indexing portion, the improvement including in combination, an elongated frame having a pair of depending leg means each along the length of the frame and joined by a support web having an upper surface, an elongated rest on one leg means extending above the said upper surface the length of said frame, an elongated stop member on the upper surface extending along a second one of said leg means accurately in a first direction parallel to the frame elongation, a unitary aligning member secured on top of said elongated stop member with a plurality of aligning spring teeth extending transversely to said first direction over said upper surface and spaced therefrom a distance less than the thickness of the mounting portions and each of said teeth adapted to slidably snugly engage a respective one of the mounting portions and being spaced apart along said first direction in accordance with the spacing of the mounting portions on said set supporting indexing portion, each of said teeth having a semiconductor die receiving receptacle opening at the free end thereof and shaped as a "V" with an enlarged opening at the apex of the "V", a pair of upstanding indexing studs on said unitary aligning member and spaced inwardly from the longitudinal ends of said frame and being located with respect to said receptacles in accordance with the location of said unitary lead strip V-shaped slots with respect to said lead portions, and adapted to receive said V-shaped slots for positioning said lead strip with respect to said die receiving receptacles, an upstanding pivot post with a downwardly facing pivot surface and said unitary aligning member located centrally between said upstanding indexing posts but spaced closer to said second one leg than said indexing posts such that said unitary lead strip does not engage said upstanding pivot post, said upstanding pivot post having a downwardly-facing pivot surface, a weight lever adapted to yieldably and evenly urge the lead portions respectively against land areas and conductor portions, the weight lever including an elongated plate having first and second portions disposed at an obtuse angle with an apex extending along said first direction and having a plurality of apertures respectively disposed over each receptacle, a unitary stainless-steel spring member secured to said second portion and having a plurality of tapered fingers extending transverse to said one direction and then downwardly through said apertures with each finger for engaging one lead portion in the lead strip, and said first portion having a pivot post engaging slotted portion adapted to movably receive said upstanding pivot post such that said downwardly facing pivot surface pivotally engages said slotted portion as said spring fingers engage the respective lead portions.

11. Apparatus for facilitating the fabrication of semiconductor devices, including a frame member for supporting a semiconductor element receiving means and having a depending pivot member, an elongated plate having first and second longitudinal edge portions and upper and lower sides and having a given weight, a leaf spring mounted on said first edge portion and having a plurality of independently-yieldable variable-tension spring fingers extending along said plate, and past said lower side, with each finger having a depending end portion for engaging a like plurality of members to receive the distributed weight, said depending pivot member pivotally engaging said second edge portion such that said fingers evenly distribute said given weight to said members, respectively.

12. The apparatus of claim 11 further including weight adding members on said second edge portion with said leaf spring secured to said plate by said weight members and wherein said plate has a plurality of apertures through which said fingers downwardly extend and with said second edge portion being at an obtuse angle with respect to said first portion such that said second edge portion is higher than said first edge portion when said second edge portion is engaging said downwardly facing pivot surface.

13. Apparatus for use in fabrication of a semiconductive device comprising:

a frame member extending longitudinally along a first direction, having an upper surface and having one longitudinal edge and an aligning means for aligning a semiconductive element at a position spaced from said upper surface, positioning means on said frame member, a holding means extending from said frame member, said semiconductive element when aligned with said frame member being so positioned with respect to said frame member as to be received by a semiconductor-element-receiving means, at least a portion of said element-receiving means being adapted to be positioned intermediate said element and said frame member so that said element is accurately aligned with respect to said semiconductor-element-receiving means, said positioning means being adapted to position an extending portion of a lead strip over said aligning means with respect to said element and said element-receiving means, and pressure means adapted to be movably disposed on said frame member for engaging said holding means and having at least one lead engaging portion for engaging a lead strip at a lead portion thereof adjacent said semiconductor element in the apparatus for forcing said lead portion against said element and said semiconductor device against said element receiving means to make a solderable contact between said lead portion and said element and between said element-receiving means and said element.

14. The invention of claim 13 in which said pressure means includes an elongated portion, said lead engaging portion comprises a spring means fastened to said elongated portion, said elongated portion having a positioning edge for engaging said positioning means and a portion for engaging said holding means, and a weight supported by said elongated portion.

15. The invention of claim 14 in which there is a triangularly shaped opening in said element aligning means with an enlarged apex facing away from said longitudinal edge for receiving a corner of said element.

16. The apparatus of claim 15 wherein said frame member has a stop member extending along said one longitudinal edge and supporting said aligning means in a spaced-apart relationship from said frame member upper surface and said stop member serving to align said semiconductor element-receiving means with respect to said frame member.

17. The invention of claim 16 in which said frame member further includes an upstanding edge member opposite said one edge and in which said element-receiving means is a portion of a mounting base strip and said upstanding edge member supports said mounting base strip.

18. The apparatus of claim 13 wherein said pressure means has a plurality of large apertures through which said lead engaging portions downwardly extend for permitting air circulation to said element-receiving means, semiconductor element and said lead strip, said pressure means having a first and second edge portions which are disposed substantially parallel to said longitudinal direction of said frame member and said first edge portion of said pressure means extending upwardly away from said frame member.

19. The apparatus of claim 18 wherein said pressure means has a pressure adding member extending along its second edge portion for reducing the total mass of said apparatus for a given force to be applied against the lead portions of the lead frame.

20. The invention of claim 19 wherein said lead engaging portion is a portion of an etch-cut stainless steel member, said lead engaging portion tapering uniformly to its smallest cross sectional dimension adjacent to the end thereof which engages said lead portion.

21. The invention of claim 13 in which said semiconductor-element-receiving means is a portion of a mounting base strip and said device aligning means extends laterally from said first direction and said mounting base strip engages said aligning means to align said base strip with respect to said frame member.

* * * * *